3,099,636
POLYMERIC ACID SALTS OF ALKYLAMINO-
ETHYL METHACRYLATE
Benjamin Franklin Skiles, Wilmington, Del., assignor to
E. I. du Pont de Nemours and Company, Wilmington,
Del., a corporation of Delaware
No Drawing. Filed May 17, 1960, Ser. No. 29,568
3 Claims. (Cl. 260—29.6)

This invention is directed to a water solution-dispersion of a polymeric water-soluble acid salt of a $C_1$ to $C_4$ 2-[mono-(or di-)alkylamino]ethyl methacrylate that gives a 1% aqueous solution having a viscosity at 25° C. of at least 500 centipoises as measured by a Brookfield viscometer spinning at 20 r.p.m. The present invention also relates to the free base of the polymeric acid salt.

The present invention is also directed to a process for preparing such polymeric materials which comprises converting a 2-[mono-(or di-)alkylamino]ethyl methacrylate to the $C_2$ to $C_5$ alkanoic acid salt and polymerizing said salt in a water solution of from 30% to about 75% concentration at 0° to about 60° C. without agitation after the first stages of the polymerization. The resulting polymeric alkanoic acid salt of the 2-[mono-(or di-)alkylamino]ethyl methacrylate may be used without further treatment, or the free-base polymer may be precipitated with alkali. The polymeric free base may then be dissolved and/or dispersed in an organic solvent for the polymer which may or may not contain a solvent-soluble acid capable of forming a soluble salt with the free base.

The free base may also be dissolved and/or dispersed in a water solution of a water-soluble acid strong enough to form an acid salt with the polymeric alkylaminoethyl methacrylate. For example, 2-(diethylamino)ethyl methacrylate, acetic acid salt, is polymerized under the above defined conditions to yield an unexpectedly high molecular weight water-soluble polymer whose 1% water solution has a viscosity at 25° C. of between 500 and 2500 centipoises as measured with a Brookfield viscometer. Such a polymer may be used as prepared or it may be converted to the free base with ammonia and dispersed in a water solution of a water-soluble inorganic or organic acid to provide a 1% solution having a viscosity at 25° C. of at least 500 centipoises. The polymeric free base may be dispersed in such a solvent as acetone or in acetone containing an organic acid to provide a viscous solution. A viscous water solution of the polymeric acid salt may be used as a thickening agent component of such compositions as textile printing pastes; cosmetics and toiletries including hair dressings, deodorants, hand lotions and creams, shaving creams; pharmeceuticals including jellies, lotions, ointments; industrial and specialty products including paints, non-flammable hydraulic fluids, polishes, cutting oils, paint and varnish removers and aqueous crude oil recovery fluids. A viscous organic solvent or mixed solvent solution of the free base or one of its salts may be also used, for example, as a thickening agent in paint and lacquer compositions, in lotions, and in paint and varnish removers. Other uses of the polymeric acid salt include its application as a flocculating agent.

It is an object of the present invention to provide a new and improved polymerization process. A further object of this invention is to provide a process for the polymerization of a $C_2$ to $C_5$ alkanoic acid salt of a 2-[mono-(or di-)alkylamino]ethyl methacrylate whereby water-soluble polymers are obtained having in dilute water solutions extremely high viscosity. Another object is to provide a new class of water-soluble and organic solvent-soluble thickening agents. Still another object is to provide water-soluble thickening agents that comprise water-soluble inorganic and organic acid salts of polymerized 2-[mono-(or di-)alkylamino]ethyl methacrylate. A still further object is to provide a free base polymer and a polymeric salt of a 2-[mono-(or di-)alkylamino]ethyl methacrylate that form viscous solutions at low concentrations in organic solvents.

These and other objects will become apparent in the following description and claims.

These objects are attained in accord with the present invention by reacting the monomeric 2-[mono-(or di-)-alkylamino]ethyl methacrylate with a stoichiometric equivalent amount of a $C_2$ to $C_5$ alkanoic acid to provide an aqueous solution of the acid salt of 30% to about 75% concentration and polymerizing the solution without agitation after the first stages of the polymerization at a temperature between 0° and 60° C., preferably in the presence of a free-radical generating agent. The free-base polymer is precipitated by neutralizing the polymeric acid addition salt with an alkaline agent and is then dissolved and dispersed in an organic solvent or in the water solution of a water-soluble inorganic or organic acid. To the solution and dispersion of the free base in a non-basic organic solvent an organic acid may be added to form the acid addition salt of the free base in the solvent.

More specifically, the present invention is directed to a water solution-dispersion of a polymer having the structural units

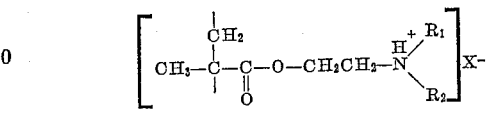

where $R_1$ is hydrogen or a $C_1$ to $C_4$ alkyl group, $R_2$ is a $C_1$ to $C_4$ alkyl group, and $X^-$ is an anion of a water-soluble acid, the polymer being characterized by being water-soluble and water-dispersible and providing a 1% aqueous solution-dispersion having a viscosity at 25° C. of at least 500 centipoises measured with a Brookfield viscometer rotating at 20 r.p.m.

A preferred embodiment of this invention is a water solution-dispersion of a polymeric acetic acid salt of 2-(diethylamino)ethyl methacrylate the 1% water solution of which has a viscosity at 25° C. of at least 500 centipoises measured with a Brookfield viscometer rotating at 20 r.p.m.

The present invention is also directed to a process for preparing a water solution-dispersion of the heretofore-described polymer the step which consists of polymerizing a $C_2$ to $C_5$ alkanoic acid salt of a methacrylic acid ester having the structure

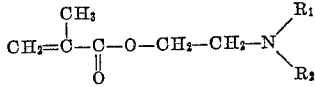

where $R_1$ is hydrogen or a $C_1$ to $C_4$ alkyl group, and $R_2$ is a $C_1$ to $C_4$ alkyl group, said polymerization being accomplished for the greater part of the last stages in an unagitated water solution of the said acid salt of the ester at a concentration of 30% to about 75% and at a temperature between 0° and about 60° C. This process may be followed with the added step of precipitating the polymer as the free base with an alkaline material, and redispersing the free base in a water solution of a water-soluble acid.

This invention also is concerned with the thickening of various aqueous compositions by incorporating minor amounts of the heretofore-described polymer. Organic solvents and mixtures of solvents may be thickened by dissolving and dispersing therein a minor amount of said polymer or the free-base polymer produced by the above-described process.

The substituted ethyl methacrylates used in the practice of this invention are methacrylic acid esters of 2-[alkyl-(or dialkyl)amino]ethanol in which the alkyl group or groups contain one to four carbon atoms. Examples of such N-alkyl-substituted aminoethanols are 2-(methylamino)ethanol, 2-(dimethylamino)ethanol, 2-(ethylamino)ethanol, 2-(diethylamino)ethanol, 2-(propylamino)ethanol, 2-(dipropylamino)ethanol, 2-(diisopropylamino)ethanol, 2-(butylamino)ethanol, 2-(dibutylamino)ethanol, 2-(tertbutylamino)ethanol, and 2-(diisobutylamino)ethanol. The aminoethanol esters of methacrylic acid are prepared by reacting methacrylic acid or a suitable derivative thereof (i.e. the anhydride, acid halide, or a lower aliphatic alcohol ester thereof) with an amino alcohol in which the amino nitrogen is secondary or tertiary or with an alkali or alkaline earth metal alcoholate of such an amino alcohol as described by Graves in U.S. 2,138,763.

The acids for forming salts of the 2-[mono-(or di-)-alkylamino]ethyl methacrylates to be polymerized to provide solutions of polymeric material of unusually high viscosity according to this invention are acetic acid, propionic acid, butyric acid, isobutyric acid and valeric acid. The acid salt of the esters are prepared by treating the ester with an equivalent amount or with an excess of the acid. Formic acid and inorganic acid salts of the esters do not polymerize under the invention conditions to give high viscosity solutions and are, therefore, excluded from the group of acids for forming salts for subsequent polymerization.

The acids for forming water solution-dispersions of salts with the free-base polymer precipitated from a polymerized solution of a $C_2$ to $C_5$ alkanoic acid salt of a monomeric alkylaminoethyl methacrylate may be any water-soluble organic or inorganic acid strong enough to form an acid salt with the free base polymers. Acids suitable for redispersing the free-base polymer include hydrochloric acid, sulfuric acid, sulfurous acid, carbonic acid, phophoric acid, nitric acid, fluosilicic acid, formic acid, acetic acid, propionic acd, butyrc acid, acrylic acid, methacrylic acid, chloroacetic acid, benzenesulfonic acid, o-, m-, or p-toluenesulfonic acid, oxalic acid, lactic acid, camphoric acid, benzoic acid, succinic acid, tartaric acid, phthalic acid, and the like.

The acids for forming solvent solution-dispersions of addition salts with the free-base polymer are preferably organic acids strong enough to form a salt, such as acetic acid, propionic acid, benzoic acid. In polar solvents like methanol and 2-methoxy ethanol, hydrochloric acid salts of the base polymer also dissolve and disperse to provide solution-dispersions having high viscosity.

The polymerization of the selected salts of a freshly distilled alkylaminoethyl methacrylate of the invention commences and proceeds to provide highly viscous polymeric products without a catalyst or initiator of polymerization being intentionally added in the form of a chemical agent. Light, if present, and traces of extraneous material that may be contained in the solution serve to initiate the polymerization in the absence of an added catalyst. Under such conditions, however, the polymerization rates vary widely and are usually slow. In order to accelerate the polymerization and to control the reaction to provide a uniform, practical process a free-radical generating agent is preferably used as an initiator or catalyst.

A suitable catalyst for the polymerization of the selected acid salts of the alkylaminoethyl methacrylate may be any one of the commonly known agents for initiating the polymerization of an ethylenically unsaturated compound. Benzoyl peroxide, lauroyl peroxide, tert-butyl perbenzoate, 1-hydroxycyclohexyl hydroperoxide, di-tert-butyl peroxide, 3-carboxypropionyl peroxide, acetyl peroxide, and alpha,alpha'-azodiisobutyroamidine hydrochloride have been used as the catalyst for the subject polymerization, and such per-oxygen compounds as diethyl peroxide, tert-butyl hydroperoxide, sodium peroxide, barium peroxide, ammonium persulfate, potassium persulfate, and such azo initiators as 2,2'-azodiisobutyronitrile, 2,2'-azobis(2,4-dimethyl-4-methoxyvaleronitrile) may be used. The polymerization may also be catalyzed by ultra-violet light and combinations of light and the chemical agents. The concentration of catalyst for the polymerization of the subject salts is usually between 0.01% and 0.2% based on the weight of the monomer. It is desirable to use a minimum concentration of a catalyst commensurate with a practical polymerization cycle to obtain a product that provides solutions having the highest viscosity.

The temperature of polymerization of the alkanoic acid salts of the 2-[mono-(or di-)alkylamino]ethyl methacrylates in water solution may be varied from 0° to 60° C. The preferred temperature is about 30° C. When the polymerization occurs at temperatures above 60° C. the structure of the polymer changes so that the viscosity of solutions of the polymeric salts decreases to low values, and the utility of the polymeric products as thickening agents is lost.

In order to obtain the desired viscous solutions the concentration of the solution of the acid salt during polymerization must be between 30% and about 75%, preferably about 50%. At higher and lower polymerizing concentrations the viscosity of dilute solutions of the polymeric product is reduced to low levels, and the product is not suitable for use as a thickening agent.

The free-base polymer is precipitated as particles resembling the curds which compose cottage cheese by neutralizing the polymeric acid salt solution as prepared, or preferably after dilution, with an alkali of enough strength to form a salt with the acid of the polymeric salt. Alkaline materials such as ammonia, sodium hydroxide, sodium carbonate ($Na_2CO_3$ and $NaHCO_3$) precipitate the free base from solution of an acid salt. The water solution may be drained from the freshly precipitated free-base polymer, and the polymer washed and then dried in an air stream, preferably at room temperature and rapidly. The base polymer may, of course, be redispersed in an aqueous acid solution without drying completely and in polar solvents in which water is also soluble. When the polymer is dried it is best dispersed at once in a solvent or aqueous acid solution because on standing the polymer becomes less readily dispersible and ultimately reaches a state in which it is not swollen by solvents and aqueous acid solutions and cannot be redispersed.

The freshly precipitated and essentially dry free-base polymer dissolves and disperses to provide a viscous 1% solution-dispersion in such solvents as acetone, benzene, butanol, 2-butanone, chloroform, cyclohexane, o-dichlorobenzene, dichloromethane, ethyl acetate, ethyl ether, methanol, 2-methoxy ethanol, nitrobenzene, pyridine, 1,1,1,2-tetrachloroethane, toluene, triethylamine. In the following solvents the free-base polymer is relatively insoluble; that is, viscous solutions are not obtained and a separate polymer phase settles from an agitated mixture. Carbon tetrachloride, dimethylformamide, methyl sulfoxide, hexane, nitromethane, and petroleum ether. The acetic acid salt of freshly precipitated free-base polymer gives viscous 1% solution-dispersions in such solvents as acetone, butanol, 2-butanone, chloroform, 2-chloromethane, ethyl acetate, ethyl ether, methanol, 2-methoxyethanol, nitrobenzene, nitromethane, pyridine, 1,1,1,2-tetrachloroethane, triethylamine but is relatively insoluble in such solvents as benzene, carbon tetrachloride, cyclohexane, o-dichlorobenzene, dimethylformamide, methyl sulfoxide, dioxane, petroleum ether, and toluene. The hydrochloric acid salt of the base polymer gives a viscous solution-dispersion in methanol and 2-methoxy ethanol. The sulfuric acid salt of the base polymer dissolves and disperses in methanol.

The polymerization of the selected alkanoic acid salt of a 2-[mono-(or di-)alkylamino]ethyl methacrylate is conducted in thin layers of a 30% to 75% water solution of the ester salt without agitation or with low shear agitation during the first stages of the polymerization while the solution is still fluid and can be readily poured. Mild agitation up to this point in the polymerization permits stirring for dissolving and uniformly mixing the catalyst in the monomeric salt, avoids having to prevent any polymerization from occurring until the material to be polymerized is poured into the polymerization container and may assist in cooling the solution during the early stages of the polymerization. Agitating the solution during polymerization beyond the early stages results in a polymer product of much lower viscosity and of much reduced value as a thickening agent.

The solution, even at the lowest concentration of 30%, progressively thickens and becomes a stiff, tacky jelly-like mass. Through such a mass heat transfer is low, and unless the thickness of the mass is restricted, the generated heat of polymerization heats the material above the 60° C. limit for obtaining the desired viscous product. Accordingly, the monomeric salt solution or a solution that is in only the early stages of polymerization is poured into such a container as a tray, shallow pan, or flat plastic bag and allowed to polymerize in a quiescent layer normally about two inches in thickness. The polymerization may be done continuously in such a layer or depth of solution, for example, on a moving polytetrafluoroethylene-lined belt. Polymerization occurs during the travel time of the belt, and the jelly-like product is removed at the point where the belt reverses its direction.

Representative examples illustrating the present invention follow.

EXAMPLE 1

*Polymerization of 2-(Diethylamino)Ethyl Methacrylate, Acetic Acid Salt*

(A) Benzoyl peroxide (1 g.) was dissolved in 325 g. (5.4 moles) of glacial acetic acid at room temperature. This solution was slowly added to 1000 g. (5.4 moles) of 2-(diethylamine)ethyl methacrylate keeping the temperature at 17±2° C. with external cooling. Water (1325 g.) was then slowly added to the acetic acid salt of the amine ester using an ice bath to hold the temperature at 15±1° C. The resultant solution was poured into an enamel-lined pan to give a two-inch depth of solution and allowed to warm to 25° C. at which temperature the monomer began to polymerize at an appreciable rate, and the temperature of the solution increased to about 45° C. over a period of about 2 hours owing to the heat of polymerization. A rubbery jelly-like product formed which readily dispersed in water to provide highly viscous solutions. A 1% solution of the polymer had a viscosity of 1500 centipoises at 25° C. as measured with a Brookfield viscometer spinning at 20 r.p.m.

A 1500 g. portion of the solution of the monomeric salt was prepared as shown above and placed in a 3 liter-capacity kneader mill having sigma blades, the jacket of which was maintained at 29±2° C. Polymerization was allowed to proceed with the mixer running continuously. A sample taken from the mixer after 20 hours was diluted to a 1% solution and found to have a viscosity of 62 centipoises as measured with a Brookfield viscometer spinning at 20 r.p.m. A control sample of the solution that was polymerized in a quiescent state outside the mixer provided a 1% solution of polymer having a viscosity of 1825 centipoises. These results show that the agitation in the mixer prevented the obtaining of long chains of high molecular weight polymer to provide the high viscosity.

When a portion of the jelly-like polymer from the polymerization without agitation was worked in the mixer by the rotation of the mixer blades for 20 hours the viscosity of the polymer in a 1% solution decreased from 1825 centipoises to 240 centipoises. During the period of agitation in the mixer the intrinsic viscosity of the free-base polymer measured in acetone decreased from 2.70 to 1.32. Thus a breakdown of the high molecular weight, high viscosity polymer to a lower molecular weight, less viscous polymer is brought about by the mechanical working of the polymer.

(B) A 93 g. portion of 2-(diethylamino)ethyl methacrylate was cooled to 10° C., and to it 30 g. of glacial acetic acid was slowly added holding the temperature at 10° C. Then 123 g. of water was added keeping the temperature between 10 and 15° C. The final solution contained no purposely-added free-radical generating agent. The solution was poured into a one-quart polyethylene bag, and the bag and its contents were allowed to hang in the room for 24 hours. During the daylight portion of this period the solution was exposed to diffuse daylight and light from sources of artificial illumination. The gelatinous product that had formed gave a 1% water solution having a viscosity of 1370 centipoises at 25° C. as measured with a Brookfield viscometer spinning at 20 r.p.m.

EXAMPLE 2

In the procedure of Example 1, 5.4 moles of propionic acid, butyric acid, isobutyric acid, and valeric acid were substituted for the acetic acid and similar rubbery gels of polymer were produced. One percent water solutions of the polymers made with the respective acids had the viscosities given below.

| Acid used to form salt | Viscosity of 1% solution at 25° C., Brookfield viscometer at 20 r.p.m. in centipoises |
|---|---|
| Propionic | 1,610 |
| Butyric | 1,500 |
| Isobutyric | 680 |
| Valeric | 570 |

Although the isobutyric and valeric acids used to form the acid salts give solutions of polymers that are much less viscous than the solutions obtained with acetic and propionic acids, these acids serve to form salts that polymerize to yield dilute solutions of unusually high viscosity.

EXAMPLE 3

Following the procedure of Example 1 for the make-up of the ester salt solution, 200 g. batches of material taken from the total initial solution were polymerized in a two-inch layer in polyethylene bags at various temperatures which were maintained during the polymerization by external cooling or heating as required. The polymeric products were examined after 16 hours in each experiment except the polymerization product made at 0° C. which was examined after two weeks. The viscosity of a 1% water solution of the polymeric products is shown below.

| Temperature of Polymerization, ° C. | Viscosity of 1% solution at 25° C., Brookfield viscometer at 20 r.p.m. in centipoises |
|---|---|
| 0 | 2,180 |
| 15 | 2,240 |
| 22.5 | 2,200 |
| 30 | 2,080 |
| 45 | 1,930 |
| 60 | 1,050 |
| 100 | 30 |

The viscosity of the 1% solution begins to fall sharply when the polymerization temperature exceeds 45° C. At a polymerization temperature much over 60° C. the solutions are relatively low in viscosity, and the thickening capacity of the polymer is lost.

EXAMPLE 4

Following the procedure of Example 1 the solution of benzoyl peroxide in the mixture of glacial acetic acid, and 2-(diethylamino)ethyl methacrylate monomer was made up, and portions were diluted with water to provide 250 g. batches of solution of various concentrations which were allowed to stand in polyethylene bags at room temperature for four days. Then 1% solutions were prepared, and the viscosity was measured with the results given below.

| Concentration of solution of 2-(diethylamino) ethyl methacrylate, acetic acid salt, in percent | Viscosity of 1% solution at 25° C., Brookfield viscometer at 20 r.p.m. in centipoises |
|---|---|
| 100 | <100 |
| 90 | 160 |
| 80 | 220 |
| 70 | 1,220 |
| 60 | 1,220 |
| 50 | 1,650 |
| 40 | 1,440 |
| 30 | 830 |
| 20 | 390 |
| 10 | <100 |

The viscosity of the 1% solution of the polymeric product increases with the addition of water to the salt of the monomeric amino ester of methacrylic acid, passes through a maximum at about 50% concentration of the addition salt, and decreases with further dilution. The concentration range of the polymerizing solution for obtaining the polymer having the desired high viscosity and thickening properties is about 30% to about 75%.

EXAMPLE 5

In 60 g. of glacial acetic acid was dissolved 0.25 g. of benzoyl peroxide, and this solution was slowly added to 157 g. of 2-(dimethylamino)ethyl methacrylate at a temperature of 10° C. maintained with an ice bath. Then, not allowing the temperature to exceed 18° C., 217 ml. of water were slowly added. The solution was poured into an enamel-lined pan to give a depth of solution of about ½ inch and allowed to warm to room temperature where it polymerized to a rubbery gel. A 1% water solution of the polymeric product had a viscosity at 25° C. of 1400 centipoises as measured with a Brookfield viscometer spinning at 20 r.p.m.

EXAMPLE 6

Acetic acid (30 g.) containing 0.1 g. of benzoyl peroxide was slowly added to 86 g. of 2-(tert-butylamino) ethyl methacrylate at 10° C. Then 116 ml. of water were slowly added at 19±1° C. The resultant solution was poured into a polyethylene bag to give about a two-inch layer of material. The solution was then allowed to warm to room temperature and to polymerize to form a rubbery gel. A 1% water solution had a viscosity at 25° C. of 890 centipoises as measured with a Brookfield viscometer rotating at 20 r.p.m.

EXAMPLE 7

A 1% solution of the polymeric acetic acid salt of 2-(diethylamino)ethyl methacrylate was prepared by diluting a 50% solution as described in Example 1, and with rapid stirring a 28% ammonia solution was slowly added until the solution was strongly alkaline to Brilliant Yellow test paper. The free-base polymer precipitated as curd-like particles which were filtered off and washed free of alkali and drained on the filter to a drip-free condition. The moist product dissolves and disperses in many organic solvents such as acetone, benzene, ethyl acetate, methanol, pyridine, to give highly viscous solutions.

When the free base product is placed in a water solution of the following organic or inorganic acid it slowly swells, and with rapid agitation dissolves and disperses to form a viscous solution. Some representative viscosities of 1% solutions of the free base in solutions of these acids are:

| Acid | Moles of acid per mole of monomer unit in the free base polymer | Viscosity of 1% solution at 25° C., Brookfield viscometer at 20 r.p.m., in centipoises |
|---|---|---|
| Carbonic | 1.1 | 5,420 |
| Hydrochloric | 1.5 | 1,830 |
| Nitric | 1.5 | 1,660 |
| Phosphoric (H₃PO₄) | 1.5 | 3,660 |
| Sulfuric | 0.5 | 564 |
| Acetic | 1.5 | 5,470 |
| Acrylic | 1.3 | 4,030 |
| Benzoic | 1.5 | 6,000 |
| Camphoric | 1.5 | 3,990 |
| Citric | 1.3 | 1,150 |
| Formic | 1.5 | 5,800 |
| Lactic | 1.5 | 5,980 |
| Methacrylic | 1.5 | 5,260 |
| Oxalic | 0.7 | 4,060 |
| Phthalic | 1.5 | 2,250 |
| Propionic | 1.5 | 4,420 |
| Sulfamic | 1.5 | 4,650 |
| Succinic | 1.3 | 1,400 |
| Tartaric | 1.5 | 4,440 |
|  | 1.5 | 1,950 |

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A water solution of a polymer, said polymer being characterized by being water soluble to provide a 1% aqueous solution having a viscosity at 25° C. of at least 500 centipoises measured with a Brookfield viscometer rotating at 20 r.p.m. prepared by polymerizing a $C_2$ to $C_5$ alkanoic acid salt of a methacrylic acid ester having the structure

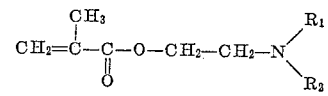

wherein $R_1$ is taken from the group consisting of hydrogen and a $C_1$ to $C_4$ alkyl group, and $R_2$ is a $C_1$ to $C_4$ alkyl group at a concentration in water within the range of 30% to 75% and at a temperature between 0° and about 60° C., said water solution, after said monomeric salt has been uniformly mixed therein, being essentially in an unagitated condition throughout subsequent polymerization.

2. A water solution of a polymer, said polymer being characterized by being water soluble to provide a 1% aqueous solution having a viscosity at 25° C. of at least 500 centipoises measured with a Brookfield viscometer rotating at 20 r.p.m. prepared by polymerizing an acetic acid salt of 2-(diethylamino)ethyl methacrylate at a concentration in water within the range of 30% to 75% and at a temperature between 0° C. and 60° C., said water solution, after said monomeric salt has been uniformly mixed therein, being essentially in an unagitated condition throughout subsequent polymerization.

3. A process for preparing a water solution of a polymer as hereinafter defined, said polymer being characterized by being water soluble to provide a 1% aqueous solution having a viscosity at 25° C. of at least 500 centipoises measured with a Brookfield viscometer rotating at 20 r.p.m., which consists of polymerizing a $C_2$ to $C_5$ alkanoic acid salt of a methacrylic acid ester having the structure

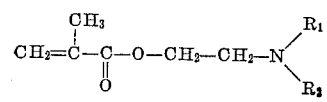

wherein $R_1$ is selected from the group consisting of hydrogen and a $C_1$ to $C_4$ alkyl group, and $R_2$ is selected from a $C_1$ to $C_4$ alkyl group at a concentration in water within the range of 30% to about 75% and at a temperature between 0° and about 60° C., said water solution, after said monomeric salt has been uniformly mixed therein, being essentially in an unagitated condition throughout subsequent polymerization.

References Cited in the file of this patent

UNITED STATES PATENTS

| | | |
|---|---|---|
| 2,138,762 | Harmon | Nov. 29, 1938 |
| 2,169,366 | Meigs | Aug. 15, 1939 |
| 2,770,518 | Conciatori et al. | Nov. 13, 1956 |
| 2,838,397 | Gruntfest et al. | June 10, 1958 |